Nov. 10, 1964  G. W. McCLURE  3,156,842
GAS IONIZER
Filed Oct. 8, 1962  3 Sheets-Sheet 1

INVENTOR
Gordon W. McClure

BY *Irons, Birch, Swindler & McKie*
ATTORNEYS

Nov. 10, 1964 G. W. McCLURE 3,156,842
GAS IONIZER
Filed Oct. 8, 1962 3 Sheets-Sheet 2

LEGEND
→ = ELECTRIC FIELD LINE OF FORCE
----- = EQUIPOTENTIAL

INVENTOR
Gordon W. McClure

BY
Irons, Birch, Swindler & McKie
ATTORNEYS

3,156,842
GAS IONIZER
Gordon W. McClure, 4627 Trumbull Ave. SE.,
Albuquerque, N. Mex.
Filed Oct. 8, 1962, Ser. No. 228,999
17 Claims. (Cl. 313—63)

This invention relates to gas ionization and, more particularly, to apparatus for ionizing very low pressure gases.

This application is a continuation-in-part of copending application Serial No. 176,973, filed March 2, 1962, now abandoned.

Gas ionizers may be used in such diverse types of apparatus as ion accelerators, ionic propulsion engines, high vacuum pumps and vacuum gauges. Apparatus presently available on the market for ionizing gases for such applications, when the gases are at very low pressure, are relatively inefficient in terms of electrical energy input per ion produced. Even the most efficient ionizers require bulky, and/or inefficient auxiliary equipment to provide the special environments needed for normal operation. In currently-used ionizers such environments include radio frequency fields, magnetic fields, and/or electron or other charged particle beams from electrically heated filaments or from self-heated electric arcs. The devices which use self-heated electric arcs are simplest in many ways, but they require frequent replacement or adjustment during continued operation, due to electrode consumption or evaporation. Moreover, displacement of material from the electrodes to other surfaces, and the generation of ions of the displaced electrode material often cause undesired side effects in the use of such devices.

In contrast to such currently-used ionizers, as described above, the apparatus of this invention employs neither an electron-generating filament, nor an arc, nor a magnet, nor even a radio frequency power source. The apparatus of the invention therefore eliminates all of the disadvantages incident to the use of such features. The invention rather employs a pair of electrodes, one within the other, as in coaxial cylindrical configuration, with a low pressure gas within the outer electrode and a relatively high voltage applied between the electrodes.

It has been suggested in the prior art that gas may be ionized, or a discharge effected through ionization, by the use of apparatus similar to that so broadly defined as characteristic of this invention. For instance, in Reviews of Modern Physics, volume 12, April 1940, at pages 87–174, there appears an article by Druyvesteyn and Penning titled "The Mechanism of Electrical Discharges in Gases of Low Pressure." Particularly at pages 121–123 of that article there are reported experiments with determination of the breakdown potential of gas at relatively low pressure between coaxial cylinders. FIG. 35 of the article illustrates the effect of the use of rather high ratios of electrode sizes and indicates that breakdown (formation of ions) was obtained with a ratio of 300 when the voltage between electrodes reached 2,000 volts, with a gas pressure of about 0.04 millimeter of mercury. Further, the figure indicates that the breakdown voltage increases very steeply as the pressure is reduced below 0.03 millimeter of mercury. In contrast to the teaching of the Druyvesteyn and Penning article, with the apparatus of the present invention, it has been found possible to obtain ionization, and consequent discharge, at pressures substantially lower than 0.001 millimeter of mercury and with breakdown voltages or starting potentials below 1,000 volts. The present invention evidently achieves such unexpected effect primarily by a process I term orbital trapping of electrons within the apparatus. This phenomenon is an incident of the use of extremely low pressure and very large ratios of electrode sizes, and its effect in increasing the lengths of electron paths is further increased by axial trapping of the electrons achieved by urging the orbiting electrons away from the axial ends of the apparatus. The combined orbital and axial trapping effects increase the path lengths of electrons to such great extent that the likelihood of their causing an ionization event is very greatly increased.

The axial trapping effect can be obtained either by supplying an auxiliary electrode biased to cathode potential, or more negatively, or by provision of axial terminations of the outer electrode which, together with the wall portion of that electrode substantially completely enclose the discharge space.

The use of coaxial electrodes at very low gas pressure has also been suggested by L. G. Guseva in the publication "Radiotekhnika i Elektronika," volume 4, No. 8, pages 1260–1266 (1959). This article, titled "Discharge Ignition in Inhomogeneous Fields at Low Gas Pressure," examines the effect of various electrode configurations with varying distances therebetween, one of such geometries employing a coaxial configuration. FIG. 5 of the article indicates that discharge was obtained for coaxial configuration at a pressure of 0.003 millimeter of mercury at about 2,000 volts, but like the Druyvesteyn and Penning disclosure, the experimental results reported in this Russian publication indicate that the starting potential, or breakdown voltage, rises very sharply below this pressure. In contrast to this teaching, it has been found that the apparatus of this invention can achieve discharge at even lower pressures than those reported by the Russian publication, and at lower voltages. This is perhaps explained by a difference in the ratios in the electrode size between that used by Guseva and those employed in this invention. The Guseva publication does not suggest such ratio, but it has been found very important to successful operation of this invention at very low pressures that the ratio be at least 100:1 and preferably greater than 1,000:1. Moreover, though the Russian publication suggests substantially complete enclosure of the gas environment by the outer electrode, the termination of the inner electrode or the connection therefrom to the voltage supply, is shown as within the outer electrode and as being relatively large in size. The theory to be detailed subsequently in explanation of the probable reason for operation of this invention indicates that these features of the Russian apparatus would result in electrons which are orbiting close to the wire or inner electrode being drawn to the terminations, resulting in substantial loss in the average path length of such electrons and thereby decreasing the probability of ionization thereby.

It has been further suggested that discharge be effected at very low pressures with a coaxial configuration in Gale Patent 2,907,884, issued October 6, 1959. That patent, however, suggests that at very low pressures of the order of those preferred in the operation of this invention, the mean free path of the electrons is much larger than the dimensions of the ionization compartment, so that any ionization produced in the gas would be negligible without the use of a magnetic field. In contradistinction to this disclosure, it has been found that, though the ionization mean free path of 100 electron volt electrons in the apparatus of the invention is greater than the dimensions of the outer electrode, a very high level of ionization can be obtained without the use of any magnetic field.

The Gale patent also suggests the use of apertured discs attached to the outer electrode, but no indication is given of the size of the apertures in such discs and the discs are in fact employed for an entirely different purpose than the end plates forming axial terminations of the outer electrode of one embodiment of this invention. Moreover, it has been found that the size of any aperture in any such end plates, or indeed in the entire outer electrode, is extremely important to operation of the invention, and in fact the size of any such aperture should be less than half the size of the cross sectional area embraced by the outer electrode, unless some other means (such as the suitably biased auxiliary electrode mentioned above) is used to compensate for any larger aperture.

It is a prime object of the present invention to obtain ionization of very low pressure gases without the use of any magnetic field. A further object of the invention is to obtain such ionization at lower breakdown or starting potentials than indicated in the prior art. Another object of one embodiment of the invention is to achieve such ionization with an extremely simple apparatus employing only a pair of electrodes, a gas-tight enclosure and a voltage source. Such apparatus will be hereinafter described in detail in connection with its application as a neutron generator, but it may as well be employed in an ultra-high vacuum pump, a vacuum gauge, or an ionic propulsion engine.

In its application as a pump, the apparatus of the invention would function similarly to the well-known Varian Vac-Ion pump, but without the use of the magnetic field employed in such pump. In other words, the present apparatus would function to reduce the pressure in an enclosure to an extremely low level by such phenomena as cathode sputtering, gettering and the like. It is known that a vacuum pump employing the apparatus of the invention is capable of pumping down from an initial pressure of 0.01 millimeter of mercury to a final pressure of 0.0001.

In its application to vacuum gauging, the apparatus of the invention would rely upon the dependence on gas pressure of the voltage-current characteristics of the glow discharge of the invention, the voltage across the electrodes or the current between the electrodes being employed as an indication of such pressure.

The apparatus of the invention will also operate to achieve other functions where a source of ions from a gas is necessary, such applications being clear to any person familiar with gaseous electronics and knowing of the principles of the present invention.

As indicated, the apparatus of the invention, generally speaking, includes an outer and an inner electrode, the outer electrode being preferably of a figure of revolution configuration and defining a space within which a gas under very low pressure is confined. The apparatus is also provided with means for urging orbiting electrons inward from the opposite ends of the electrodes, which means may include an auxiliary electrode suitably biased, or a construction of the outer electrode such as to substantially completely enclose the discharge space. The enclosure is then such that any aperture through the outer electrode is of a size substantially smaller than the major diameter of the outer electrode and preferably less than ½ that size. A voltage source is connected to the electrodes, preferably with the inner electrode positive, to bias the electrodes to a voltage at least as high as the starting potential of the discharge, and the gas pressure within the apparatus is low enough in comparison with the outer electrode size that the ionization mean free path of 100 electron volt electrons within the outer electrode is larger than the major diameter of the outer electrode. If it is necessary to remove ions from the enclosure defined by the outer electrode, perforations may be provided either in one or more of the end portions of the outer electrode, or in the wall portion thereof, and ions may be urged away from the ionization region by development of a suitable electric field, as with a third spaced electrode biased negatively with respect to the electrodes of the discharge apparatus. That electrode may then function as the auxiliary electrode to urge orbiting electrodes inward from the adjacent end of the discharge space.

The apparatus of the invention will now be more fully described in conjunction with drawings showing a preferred embodiment thereof and explaining the manner in which the apparatus is believed to operate.

Figure 1:
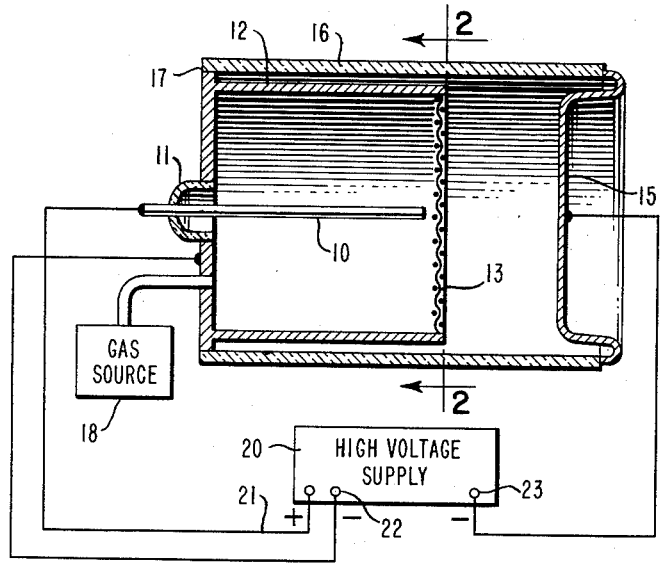
FIG. 1 is a longitudinal sectional view of a preferred embodiment of the invention employed as an ion source in a neutron generator.
Figure 2:
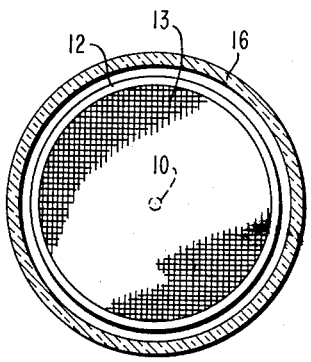
FIG. 2 is a cross-sectional view taken along line 2—2 of FIG. 1 and showing the use of a grid end plate termination of the cathode of the discharge apparatus.

Referring now to FIG. 1, the inner electrode 10 of the apparatus is a cylindrical rod which extends through a high voltage insulator 11 centered in a circular end closure comprising one end plate of the hollow cylindrical cathode 12. The rod is preferably a cylindrical wire of diameter very much smaller than the inner diameter of the cylindrical wall portion of the cathode 12. Though the wire preferably functions as an anode and the outer electrode functions as a cathode, it is possible to operate the apparatus with the opposite use of the electrodes, though with a very much higher breakdown or starting potential.

It will be noted that the inner electrode 10 extends outside of the cathode 12 and is there connected to a voltage source as will be described hereinafter. At the opposite end from such connection and from the insulator 11, the cathode is terminated by a conductive screen or grid 13 which is formed of spaced wires. Also spaced from the end plate 13 is a target electrode 15 sealed to an insulating gas-tight envelope 16. The envelope 16 is also sealed to the cathode at 17, and in use of the apparatus the assembly is first highly evacuated and then backfilled with a gas at an extremely low pressure by means of gas source 18.

A suitable high voltage supply of conventional well-known character is connected to the electrodes of the apparatus, with positive terminal 21 connected to anode 10 and negative terminal 22 connected to cathode 12. The target electrode 15 is connected to negative terminal 23 which biases that electrode to a voltage more negative than that on the cathode 12.

The ionizer itself consists of the anode 10 and the cathode wall structure 12, together with its end plates or terminations including the grid 13. The space between the grid or screen 13 and the target 15 is a drift space in which ions produced in the ionizer are accelerated to increase their energies prior to impact on the target 15. In use of the apparatus of FIG. 1, when a voltage as high as the starting potential at the particular pressure within the ionizer is applied between the anode and cathode, breakdown and self-sustained ion regeneration occurs to cause a glow discharge. If, for instance, deuterium is confined within the ionizer, and the target electrode 15 is loaded or in some other manner caused to contain tritium, the deuterium ions from the ionizer will be accelerated toward the target 15 and impinge thereon to release neutrons. It will also be understood that deuterium could be employed in both the target and the ionizer, and other combinations of target material and gas filling could be used, including tritium in the ionizer and deuterium as the target load.

An explanation will now be given for the manner in which the present invention is believed to operate to produce the unexpected discharge at such low pressures and with such relatively low starting voltages. As an aid to consideration of the phenomena here involved, reference will be made to FIG. 3 in which an outer cathode is formed by a hollow uniform circular cylinder C and an inner anode is formed by a uniform circular cylindrical structure. While the apparatus specifically disclosed in the drawings employs uniform circular cylinders for both the anode and the cathode, it will be understood that the invention will operate with many other configurations, as long as the cathode is of figure of revolution configuration, and the anode is a relatively thin rod. For convenience in explanation of the operation of the apparatus, however, the uniform circular cylinder configuration will be utilized.

The equations of motion in cylindrical coordinates $r$, $\theta$, $z$ in an electric field represented by a potential function $V(r, \theta, z)$ are:

$$m\frac{d^2r}{dt^2} - mr\left(\frac{d\theta}{dt}\right)^2 = -e\frac{\partial V}{\partial r} \quad (1)$$

$$\frac{d}{dt}\left(mr^2\frac{d\theta}{dt}\right) = -e\frac{\partial V}{\partial \theta} \quad (2)$$

$$m\frac{d^2z}{dt^2} = -e\frac{\partial V}{\partial z} \quad (3)$$

Figure 3:
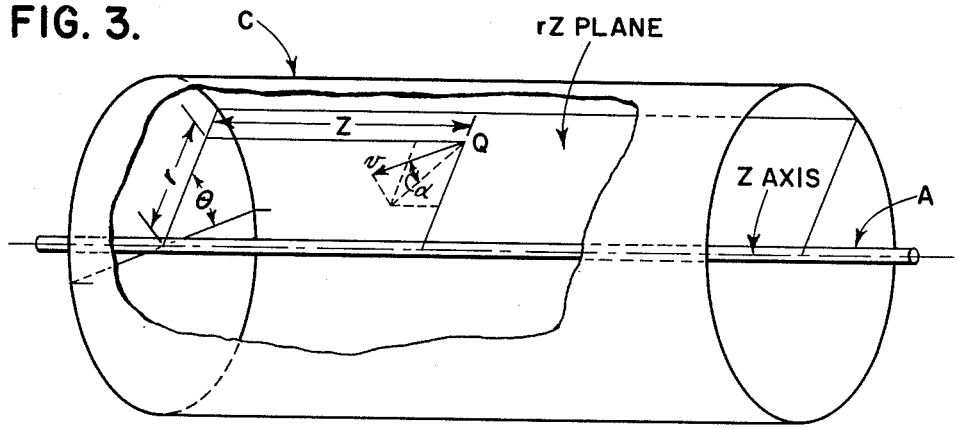
FIG. 3 is a diagrammatic showing of a pair of coaxial cylindrical electrodes used to explain the manner in which the apparatus of the invention is believed to operate.

The field is evidently symmetrical, with the structure of FIG. 3, and it is assumed that the cathode is at a negative direct current potential in respect to the anode, so that the electrons are drawn inward by the electric forces. With the $z$ coordinate axis taken along the electrode axis, the potential $V$ is independent of $\theta$ because of the assumed electrode symmetry. Accordingly, Equation 2 above can be integrated yielding the basic equation:

$$mr^2\frac{d\theta}{dt} = P \quad (4)$$

where $P$ is a constant of the motion expressible in terms of the initial conditions in the form:

$$P = mr_0^2\left(\frac{d\theta}{dt}\right)_0 \quad (5)$$

By means of Equation 4 the term $$\frac{d\theta}{dt}$$

may be eliminated from Equation 1, yielding:

$$m\frac{d^2r}{dt^2} = \frac{P^2}{mr^3} - e\frac{\partial V}{\partial r} = -\frac{\partial}{\partial r}\left[\frac{P^2}{2mr^2} + eV(r, z)\right] \quad (6)$$

Equations 3 and 6 suffice to determine both $r(t)$ and $z(t)$ in terms of the initial conditions and once $r(t)$ is known $\theta(t)$ can be obtained from Equation 5 by an integration with respect to time. For our purpose, however, detailed orbit calculations are not required and the desired information can be obtained by means of partial integration of Equations 3 and 6 which yield the following equation:

$$E = \frac{1}{2}m\left[\left(\frac{dr}{dt}\right)^2 + \left(\frac{dz}{dt}\right)^2\right] + \frac{P^2}{2mr^2} + eV(r, z) \quad (7)$$

In this equation $E$ is a constant of the motion expressible in terms of the initial conditions in the following form:

$$E = \frac{1}{2}m\left[\left(\frac{dr}{dt}\right)_0^2 + \left(\frac{dz}{dt}\right)_0^2\right] + \frac{P^2}{2mr_0^2} + eV(r_0, z_0) \quad (8)$$

where the subscript 0 indicates the initial condition.

Inspection of Equations 3 and 6 indicates that the motion in the $r$, $z$ plane is determined by an effective potential $W(r, z)$ defined as follows:

$$W(r, z) = \frac{P^2}{2mr^2} + eV(r, z) \quad (9)$$

$W$ actually is a potential energy in the $rz$ plane, while the other portion of Equation 8 represents the kinetic energy in that plane.

It will be appreciated that motion does not take place in any part of the $rz$ plane in which the kinetic energy is negative. In other words, points $r$, $z$ are accessible only if:

$$E \geq \text{(greater than, or equal to)} \ W(r, z) \quad (10)$$

Looking at this another way, any point is inaccessible if:

$$W(r, z) \geq E \quad (11)$$

Considering the anode, and using its radius as $a$, the general condition that the anode be inaccessible is:

$$\frac{P^2}{2ma^2} > E \quad (12)$$

(We have assumed that the arbitrary 0 of electrostatic potential, $V$, is placed at the anode which assumption is valid since we consider only cylindrical anodes and therefore $V = 0$ at $r = a$.)

The potential $V(r)$ for a long cylindrical cathode as shown in FIG. 3 is the following, since the $z$ dependence of $V$ is negligible:

$$V(r) = V(b)\left(\ln\frac{b}{a}\right)^{-1}\ln\frac{r}{a} \quad (13)$$

where $a$ and $b$ are the anode and cathode radii, respectively, and $V(b)$ is the potential of the cathode relative to the anode.

The form of $W(r)$ can be plotted and it will be found that it has a minimum at a radius $r_m$ whenever $P$ is not equal to zero. When that radius is between the outside surface of the anode and the inside surface of the cathode, there exists a set of values of $E$ for which any electron in the space between the anode and cathode cannot reach the cathode. Those values are defined by the equation:

$$W(r_m) \leq \text{(less than, or equal to)} \ E < W(b) \equiv \frac{P^2}{2mb^2} + eV(b) \quad (14)$$

Further, there is an overlapping set of values of $E$ for which the particle cannot reach the anode. Those values are defined by the equation:

$$W(r_m) \leq E < W(a) \equiv \frac{P^2}{2ma^2} \quad (15)$$

When both of the inequalities (14) and (15) are satisfied, the particle can reach neither of the electrodes and the electron may be said to be "radially trapped." The region of the $r$, $z$ plane which meets the necessary condition for accessibility given by Equation 10, I term the "allowed zone."

The utilization of the above equations and reasoning in explanation of the apparent operation of the apparatus of the invention may be effected by consideration of an electron which is released, as by ionization, at a position $Q$ shown in FIG. 3 and having initial $r$ and $z$ positions $r_0$ and $z_0$ and with an initial velocity $v_0$ at an angle $\alpha$ relative to the $rz$ plane. Under such conditions, $$P = mr_0 v_0 \sin \alpha \quad (16)$$

and $$E = \frac{1}{2}mv_0^2 + eV(r_0, z_0) \quad (17)$$

Substitution of these equations in the inequality (12) yields the following equation:

$$\sin \alpha > \sin \alpha_0 \equiv \frac{a}{r_0}\left[\frac{eV(r_0, z_0)}{\frac{1}{2}mv_0^2} + 1\right]^{1/2} \quad (18)$$

In this equation the angle $\alpha_c$ is the critical angle of emission of an electron relative to the $r, z$ plane above which the electron will not strike the anode. If it be assumed that the electrodes are long and are uniform circular cylinders, the $z$ dependence of V can be neglected throughout most of the volume and V is given by Equation 13. Substituting this value in Equation 18, assuming that typical secondary electrons formed in the space between the electrodes have an initial energy $(1/2)\ mv_0^2 = 10$ electron volts, choosing $V(b)$ as 1,000 volts and the ratio of the cathode radius to the anode radius $b/a = 1,000$, the following values of $\alpha_c$ may be obtained for different distances between the anode and cathode.

Table I

| $\frac{r_0}{a}$ | $\sin \alpha_0$ | $\alpha_0$ |
|---|---|---|
| 10 | 0.577 | 35° |
| 20 | 0.329 | 19° |
| 50 | 0.151 | 9° |
| 100 | 0.082 | 5° |
| 200 | 0.044 | 3° |
| 500 | 0.0193 | 1° |
| 1,000 | 0.010 | 35' |

Examination of these critical angles together with a corresponding table of critical angles for cathode inaccessibility based on Equation 14 indicates that 10 electron volt ionization secondary electrons emitted throughout 90% of the volume between the anode and cathode would be radially trapped in at least 90% of the ionizing events, assuming random initial directions of motion. With such secondary electrons radially trapped, those electrons would orbit the anode over extremely long path lengths until the electrons were deflected by collision with gas molecules. Such a collision would often merely deflect the primary electron into a different orbit, while the secondary electron from an ionization event would itself go into a radially-trapped orbit. A cascade process results in which a single electron may cause a large number of ionization events, which in turn result in a further large number of ionization events, and a breakdown or discharge occurs. I term this type of cascade process an "orbital cascade."

Most secondary electrons formed by the bombardment of the cathode by positive ions would make one orbit of the anode and return to the cathode, thus reducing the current drain in the apparatus and increasing the efficiency thereof.

The probability of the trapping effect occurring, and its resultant enhancement of ionization probability, have been found to be directly affected by change in the cathode to anode dimension ratio. If the same Equation 18 were employed with a $b/a$ ratio of 100, and a table similar to Table I derived, it would be seen that the critical angles would be very much larger than indicated in that table. However, it would also be seen that radial trapping would occur with such a ratio, but if the ratio were reduced to an even smaller figure, the likelihood of enhancement of ionization by the trapping effect would diminish very rapidly.

Figure 4:
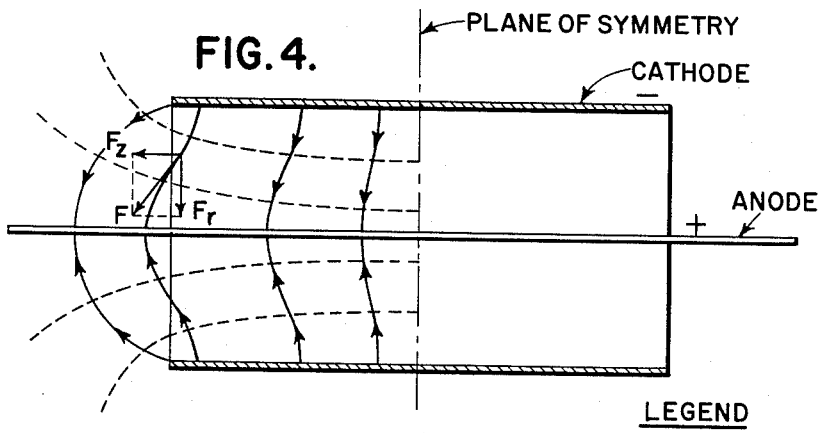
FIG. 4 is a diagrammatic showing of the force fields and equipotential lines obtained with coaxial electrodes without end plate terminations.
Figure 5:
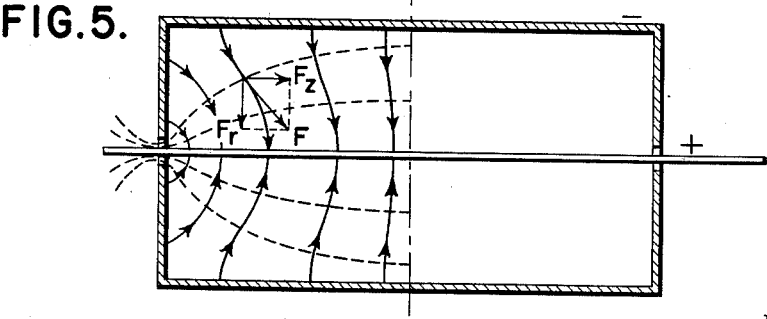
FIG. 5 is a diagrammatic showing of the same fields and lines obtained with the use of end plates as in the present invention.
Figure 6:
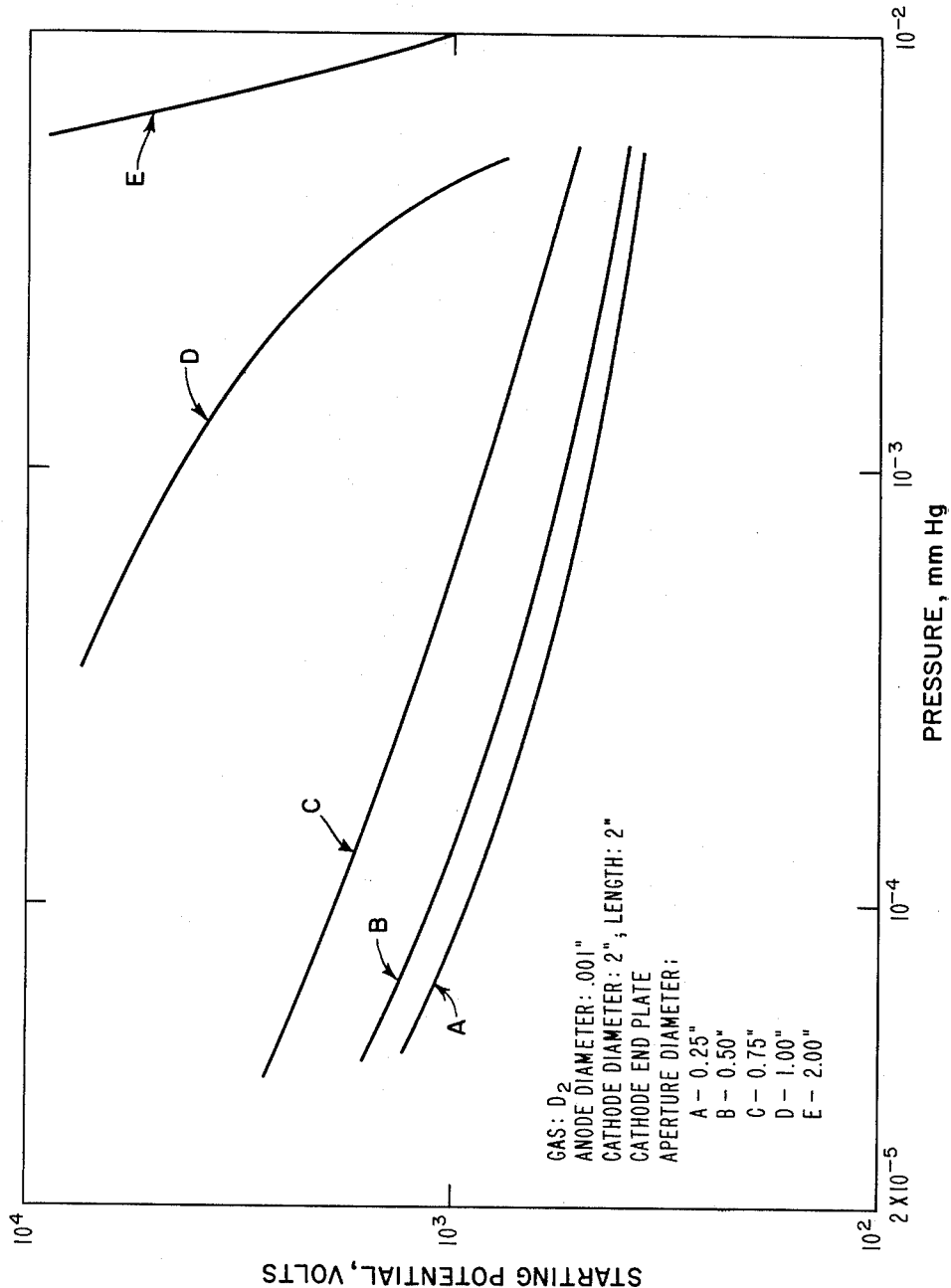
FIG. 6 shows a plurality of graphs of starting potential versus pressure in the apparatus of the invention illustrating the effect of change in size of a central aperture through an end plate; and, FIG. 7 shows various graphs of the starting potential of the discharge in the apparatus of FIG. 1, versus the gas pressure therein, with different ratios of sizes of the electrodes.

Referring now to FIG. 4, it will be seen that the electric field of force tends to urge electrons orbiting the anode out through the end of the cathode, if the cathode is open at its axial ends. In contrast, the comparable force vectors with the axial terminating end plates of FIG. 5 tend to urge electrons which have approached the axial ends of the cathode back toward the center of the space within the cathode. This effect is obtained by virtue of the end plates being connected to and forming parts of the cathode. It will be noted that these plates have apertures therethrough which may be employed, for instance, to provide for terminations of the anode wire and connection of that wire externally of the cathode to the voltage supply. Such apertures may also be employed so that positive ions developed by ionizing events within the cathode may be urged out of that space for use externally thereof. The size of these apertures has been found to be very important to the operation of the invention, because the larger the size, the smaller the effect of the forces tending to prevent orbiting electrons from leaving the cathode space, and the resultant diminishment of the probabilities of ionization by such electrons. FIG. 6 shows this effect, with the starting potential at which the discharge occurs plotted against the gas pressure in millimeters of mercury, for several different diameters of apertures through end plates. It will be seen that the curves $a$, $b$ and $c$ (respectively for ⅛, ¼ and ⅜ of the cathode diameter), are generally of the same shape, with the starting potential gradually increasing as the aperture size is increased. However, curve $d$ using an aperture only ½ as large as the cathode diameter is of an entirely different shape requiring very much higher starting potentials to initiate the discharge. Curve $e$ shows the deleterious effect of non-use of end plates. It will be apparent from a consideration of these curves that it is preferred that any aperture leading out of the space bounded by the cathode be not more than ½ the size of the cross sectional area bounded by the cylindrical wall portion of the cathode. However, as noted above, the deleterious effect of any larger aperture may be at least partially compensated for by use of an auxiliary electrode biased to the same or a more negative potential than the cathode and positioned externally to such aperture. Thus, for example, in the embodiment wherein the target electrode 15 is biased negatively with respect to the grid 13 the grid might be eliminated leaving a completely open end-aperture in electrode 12. In such case the target electrode would serve the purpose of urging orbiting electrons into the interior of electrode 12, in lieu of the grid.

Figure 7:
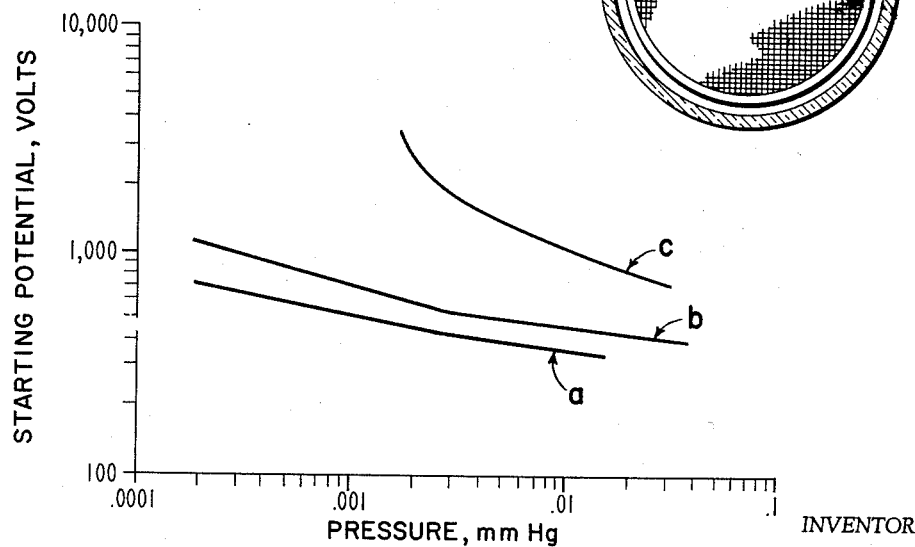

The curves shown in FIG. 7 are of the type generally referred to as "Paschen Curves," being plots of the starting potential of the gaseous discharge versus the pressure of the inner electrode environment. The curves shown were taken with respect to an ionizer having a cylindrical cathode with an inside diameter of 4.7 centimeters and a length of 5.1 centimeters, and with end closures centrally perforated by holes or apertures of 0.635 centimeter diameter. Deuterium was used as the discharge gas.

Those familiar with Paschen Curves for other electrode configurations will immediately notice that, considering the range of starting potentials shown, the curves lie in a region of much lower pressure than those usually encountered, in particular with a parallel plate electrode configuration of comparable dimensions. In other words, with the apparatus of the present invention, it is possible to obtain a discharge at relatively convenient potentials of the order of 2,000 volts, or less, and at very much lower pressures than is possible with other electrode configurations. The extremely low operating pressure is a very important feature of the invention, for one reason because it allows the ion source to be physically combined with the drift space of an ion accelerator, operating at the same low pressure, and without significant energy degradation of the ion beam due to charge exchange collisions of ions from the source with gas molecules in the drift space of the accelerator.

The criterion that must be fulfilled in order that drift space collisions will not significantly degrade the performance of a neutron-producing accelerator is that the product $ps$, where $p$ is the gas pressure in the drift space in millimeters of mercury (mm. Hg) and $s$ is the length of the drift space in centimeters (cm.), must be less than $4 \times 10^{-3}$. At the same time, in order that spurious vacuum sparking across the drift space may be avoided at the high drift space potentials (100 to 200 kilovolts) required for optimum neutron yields, it is necessary that the space $s$ be longer than 2 cm. Hence the above condition on the product $ps$ can be fulfilled only if $p$ is less than $2 \times 10^{-3}$ mm. Hg. In contrast to most ionizers of the prior art, the ionizer of this invention not only operates readily at this pressure, but will operate at much lower pressure with no difficulty. Consequently, using the ionizer of this invention, a neutron-producing accelerator of maximum efficiency can be combined therewith without incorporating a pump to provide pressure differential between the ionizer and the drift space.

Although performance of comparable merit can be obtained through use of a Penning type ion source (one effecting a cold cathode discharge through use of a magnetic field), this type of source requires the use of a magnet. The elimination of the necessity for magnets provided for by this invention is a considerable advantage, particularly when a system of minimum size, weight and cost is required.

The curves of FIG. 7 also show the effects of changing the diameter of the anode while the cathode size and configuration remain constant as above defined. The curve labeled $a$ was obtained with apparatus using a wire anode having a diameter of 0.001 inch. Curve $b$ shows the effect of increasing the anode diameter to 0.005 inch. Curves $a$ and $b$ are similar in that the starting potential varies only slightly over a considerable range of pressure. However, when the anode diameter was increased to 0.02 inch, the starting potential at the minimum pressure plotted was about 8 times the starting potential at the corresponding pressure for which discharge was obtained with the 0.001 inch anode. These effects are shown in curve $c$, and in obtaining that curve it was impossible to cause a discharge at pressures lower than the minimum indicated at the curve.

The mathematical explanation for the increase in minimum pressure at which discharge can be obtained, as the anode size is increased with respect to cathode size, will be apparent from the equations derived above. The physical explanation for the phenomenon apparently is that, as the anode increases in size, it intercepts orbiting electrons at earlier stages of their orbits. The total path length of the individual electron is therefore decreased and the probability of collision with a gas molecule is correspondingly decreased. Therefore, with a given applied potential, a higher pressure is required to increase the number of gas molecules present and therefore enhance the probability of a ionzing collision enabling initiation of the discharge. The orbital cascading process in the ionizer of the invention is very materially reduced if the wire diameter is larger than one hundredth of the diameter of the wall portion of the cathode. Nevertheless, for some purposes, for instance where a very high ion yield is required and power efficiency is of secondary importance, a wire diameter as large as one tenth of the diameter of the cathode might be employed. Even in such case all of the effects of the orbital cascade described herein would not be lost.

It will also be understood from the mathematical analysis above provided that the prolonged electron path length which results from the electron orbiting phenomenon with respect to the anode greatly increases the probability that an electron will undergo an ionizing collision with a gas molecule. This feature permits the discharge to sustain itself in the ionizer of the invention at pressures so low that the ionization mean free path for electrons is hundreds of times the length of the interelectrode spacing. It will be understood that the ionization mean free path depends on the energy of the electrons, as well as the pressure of the gas, so that the criterion correlating the electron mean free path and the size of the cathode and the pressure is herein stated in terms of electrons of 100 electron volts energy.

In the case of a figure-of-revolution cathode with a coaxial anode wire, the allowed radial zone of motion is fixed by the initial conditions. When the allowed zone excludes the wire and the cathode an indefinite periodic oscillation occurs, which oscillation cannot intercept an electrode until a scattering between the electron and a gas molecule changes the allowed zone. When the allowed zone excludes the wire, as it does in the case of most secondary electrons from the cathode, but includes some part of the cathode, as in the case of all cathode secondaries, the electron will never hit the anode without at least one gas scattering, but until such scattering occurs the cathode remains energetically accessible. If the cathode is an infinite length cylinder, unscattered secondary electrons from the cathode will always return thereto after one swing around the wire anode, if they miss the wire. When the ends of a finite length cylindrical cathode are closed by apertured plates, the electron will always return to the cathode if it fails to scatter, but several radial oscillations can occur in many cases before such return. This effect also increases the probability of ionization during the travel of such an electron.

The number of orbiting electrons whose origin can be traced back to any single electron in an orbital cascade is ultimately limited by scattering collisions and energy losses. These collisions cause every orbital cascade to terminate after a finite number of generations of electrons and ions has occurred. In spite of such termination, the discharge sustains itself indefinitely, because electrons which are capable of initiating new orbital cascades are released both from ionization events between the electrodes and by incidence upon the cathode of positive ions born in decaying orbital cascades. In the steady-state discharge the initiation and decay of cascades occur at the same rate.

The intensity of the discharge may be controlled by adjusting the applied potential or by inserting a current-limiting resistance in series with the electrodes. Once initiated, the electrical discharge sustains itself indefinitely as long as the applied potential exceeds the starting potential, and the power dissipation is held within limits such that the electrodes are not destroyed due to excessive heating. The ionizer of the invention is capable of producing ions continuously or in short pulses, depending upon the manner of application of the voltage between the anode and cathode. It will be understood therefore that the invention is not limited to use of a steady state negative bias on the cathode of the apparatus, but rather the voltage may be changed either periodically or intermittently, and in fact may be reversed in polarity and still a discharge will occur as long as the applied voltage exceeds the starting potential required. Further, it is not absolutely essential that the inner electrode be positive with respect to the outer electrode for discharge to occur, since discharge may occur with a positive outer electrode, though at much higher voltages and, in general, higher pressures, than the minimums obtained with a positive inner electrode. The rate of ion production can be adjusted to any value from about $10^{-6}$ amperes to at least 10 amperes. The actual upper limit on the ion production rate obtainable with the invention is believed to be solely dependent on the operational duty cycle, the scale or size of construction, and the manner in which the electrodes are cooled.

In the preferred embodiment of the invention as described hereinabove, the cathode is a hollow cylinder closed at its ends to prevent loss of electrons. Other figures or surfaces which are substantially circular, or surfaces of revolution, and which provide the preferred "necking down" at the axial ends of the cathode, could be employed. For instance, the wall portion of the cathode could be an ellipsoid, rather than a cylinder, or the cathode could be of circular cross-section of progressively decreasing diameter going away from the center of its length. The anode must, however, at least be close to the axis of the cathode wall portion and extend parallel thereto. The anode is desirably as small as possible consistent with the desired high ratio of the major diameter of the cathode wall portion to the thickness of the anode. Ordinarily therefore, the smallest wire which will not melt at the required level and duration of ion production will be employed as the anode.

It will be understood that the inner electrode 10 of the preferred embodiment may be supported by means of a small insulator mounted on the center of grid 13 to provide mechanical stability.

The objectives of the invention are best obtained when the dimensions of the ionizer, and the pressure of the gas therein, are such that the product $pd$ is less than a quantity $x$, where $x=0.2$ if the gas is hydrogen or an isotope thereof and the pressure ($p$) is in millimeters of mercury and the major diameter of the cathtde ($d$) in centimeters. This relationship is approximately the same as the criterion that the ionization mean free path of 100 electron volt electrons be greater than the major diameter of the cathode. The quantity $x$ in the former relationship varies by a factor of about 13 when different gases other than hydrogen and its isotopes are employed.

It will be understood by those skilled in the art that the discharge obtained with the apparatus of this invention is not of the well-known Townsend type, since such discharge requires a presure much higher than that at which the apparatus of this invention is capable of operating.

It will be apparent from the above that many changes can be made in the apparatus of the invention without departure from its scope. The invention is therefore not to be considered limited to the preferred embodiment disclosed herein, but rather only by the scope of the appended claims.

I claim:

1. Apparatus effective in ionizing a gas without use of a magnetic field comprising
   a first metal electrode having a hollow wall portion shaped substantially as a figure of revolution,
   a second metal electrode of rod shape positioned substantially along the axis of said wall portion, the cross-sectional size of said second electrode being very much smaller than the cross-sectional area within said wall portion,
   means for biasing one of said electrodes negatively with respect to the other to a high voltage,
   means for providing an environment of said gas at very low pressure within the space bounded by said first electrode, the pressure of said gas and the dimensions of the wall portion of the first electrode being such that the ionization mean free path of 100 electron volt electrons in said gas is greater than the largest inside diameter of said wall portion,
   the said voltage being higher than the starting potential of ion discharge in the said apparatus,
   and means extending at least part way across the space bounded by said first electrode for urging electrons adjacent the opposite ends of said first electrode inwardly away from such ends.

2. The apparatus of claim 1 in which said urging means includes an auxiliary electrode positioned adjacent one of the ends of said first electrode and biased to a negative voltage at least as large as that on said one electrode.

3. The apparatus of claim 2 in which said urging means further includes an axial termination for the end of said first electrode opposite the end adjacent said auxiliary electrode, said first electrode substantially completely enclosing a discharge space having no opening through the first electrode of size greater than one-half of the cross-sectional area within said hollow wall portion, except at its end adjacent said auxiliary electrode.

4. The apparatus of claim 1 in which said urging means includes axial terminations of said first electrode of configuration such that the first electrode substantially completely encloses a discharge space with any opening through said first electrode of size much smaller than the maximum cross-sectional area within said hollow wall portion.

5. The apparatus of claim 4 in which said biasing means includes a source of high voltage and connections between said source and said electrodes, the connection to said second electrode being outside of said space enclosed by the first electrode.

6. The apparatus of claim 4 in which said first electrode is a cathode biased negatively with respect to said second electrode, forming an anode.

7. The apparatus of claim 6 in which said cathode has a grid end member formed of spaced wires defining an axial termination of said wall portion thereof.

8. The apparatus of claim 6 in which said cathode has an end member defining an axial termination of said wall portion thereof, said end member having a substantially central aperture therethrough less than one-half as large as said cross-sectional area bounded by the wall portion of the cathode.

9. The apparatus of claim 6 in which the pressure of said gas in millimeters of mercury and the major diameter of the wall portion of the cathode in centimeters are such that their product is less than a quantity $x$, where $x=0.2$ for hydrogen and isotopes thereof, and $x$ varies by a factor of about 13, depending upon the nature of the gas employed in the said apparatus.

10. The apparatus of claim 6 in which said anode is a straight cylindrical wire of such diameter that the major inside diameter of said cathode is more than one hundred times as large thereas.

11. The apparatus of claim 10 in which the major diameter of the cathode is more than 1,000 times as large as the diameter of said wire anode.

12. The apparatus of claim 6 including a third electrode spaced from said anode and cathode and within said environment of low pressure gas,
   and means for biasing said third electrode more negatively than said cathode to attract positive ions from the space within said cathode.

13. Apparatus effective in ionizing a gas without use of a magnetic field comprising
   a hollow cylindrical metal cathode having end members defining axial terminations thereof and joined thereto, said end members and said wall portion substantially completely enclosing a space therewithin with any opening therethrough of size much smaller than the cross-sectional area within said wall portion,
   a cylindrical wire anode extending axially of said cathode through substantially the entire length thereof, the diameter of said cathode being at least 1,000 times as large as the diameter of said anode,
   a gas-tight enclosure around said cathode confining gas under very low pressure therein, the pressure of said gas in millimeters of mercury and the diameter of said cathode in centimeters being such that their product is less than a quantity $x$, where $x=0.2$ for hydrogen and isotopes thereof and varies by a factor of about 13 depending upon the nature of the gas employed in the apparatus,
   and means for biasing the cathode negatively with respect to the anode to a voltage higher than the starting potential of ion discharge in the said apparatus.

14. The apparatus of claim 13 in which said biasing means includes a source of high voltage and connections between said source and the said electrodes, the connection to said anode being outside of said space enclosed by the cathode.

15. The apparatus of claim 13 in which the cathode has at least one aperture therethrough of size less than one-half as large as said cross-sectional area bounded by said cathode,
   a third electrode spaced from said anode and cathode and within said gas-tight enclosure,
   and means for biasing said third electrode to a voltage more negative than that of said cathode.

16. The apparatus of claim 15 in which said third electrode carries a material operative to produce neutrons when struck by positive ions developed from said gas.

17. The apparatus of claim 16 in which the gas is one of hydrogen and the isotopes thereof and the product of the pressure of said gas in said enclosure measured in millimeters of mercury and the diameter of the cathode measured in centimeters is less than 0.2.

References Cited in the file of this patent
UNITED STATES PATENTS 1,358,031    Smith ------------------ Nov. 9, 1920

OTHER REFERENCES

"Townsend Discharge in a Coaxial Diode With Axial Magnetic Field," by P. A. Redbead.